United States Patent [19]

Nawrocki et al.

[11] Patent Number: 5,263,057
[45] Date of Patent: Nov. 16, 1993

[54] METHOD OF REDUCING WAITING TIME JITTER

[75] Inventors: Rainer Nawrocki, Hamburg; Siegfried Brünle, Esslingen; Wolfgang Ehrlich, Allmersbach i. T., all of Fed. Rep. of Germany

[73] Assignee: Ant Nachrichtentechnik GmbH, Backnang, Fed. Rep. of Germany

[21] Appl. No.: 697,999

[22] Filed: May 9, 1991

[30] Foreign Application Priority Data

May 9, 1990 [DE] Fed. Rep. of Germany ....... 4014813
May 9, 1990 [DE] Fed. Rep. of Germany ....... 4014814

[51] Int. Cl.$^5$ ........................................... H04L 7/027
[52] U.S. Cl. .................................... 375/118; 370/102
[58] Field of Search ................ 375/107, 112, 118, 119; 370/100.1, 101, 102, 105.1, 105.3; 369/60; 328/55, 63, 72

[56] References Cited

U.S. PATENT DOCUMENTS

| | | | |
|---|---|---|---|
| 4,095,053 | 6/1978 | Duttweiler et al. | 370/102 |
| 4,731,646 | 3/1988 | Kliem | 375/118 |
| 4,811,340 | 3/1989 | McEachern et al. | 370/102 |
| 4,920,547 | 4/1990 | Murakami | 370/102 |
| 5,067,126 | 11/1991 | Moore | 370/102 |

Primary Examiner—Curtis Kuntz
Assistant Examiner—Young Tse

[57] ABSTRACT

A method of recovering an original digital signal, after pulse stuffing, with reduced waiting time jitter. The original digital signal is written into a first elastic memory in a synchronizer. A pulse stuffed output of the synchronizer is transmitted to a desynchronizer where bits of the original signal are written into second elastic memory. Average values of fill levels of elastic memories in a synchronizer and in a desynchronizer are determined. The average value determined in the synchronizer is transmitted to the desynchronizer where a comparison of the respective average values is made in a comparator. A clock signal generating circuit in a phase locked loop is controlled by an output signal of the comparator so as to generate a clock signal. The signal bits written into the second elastic memory are read out of the second elastic memory at the rate of the generated clock signal.

15 Claims, 3 Drawing Sheets

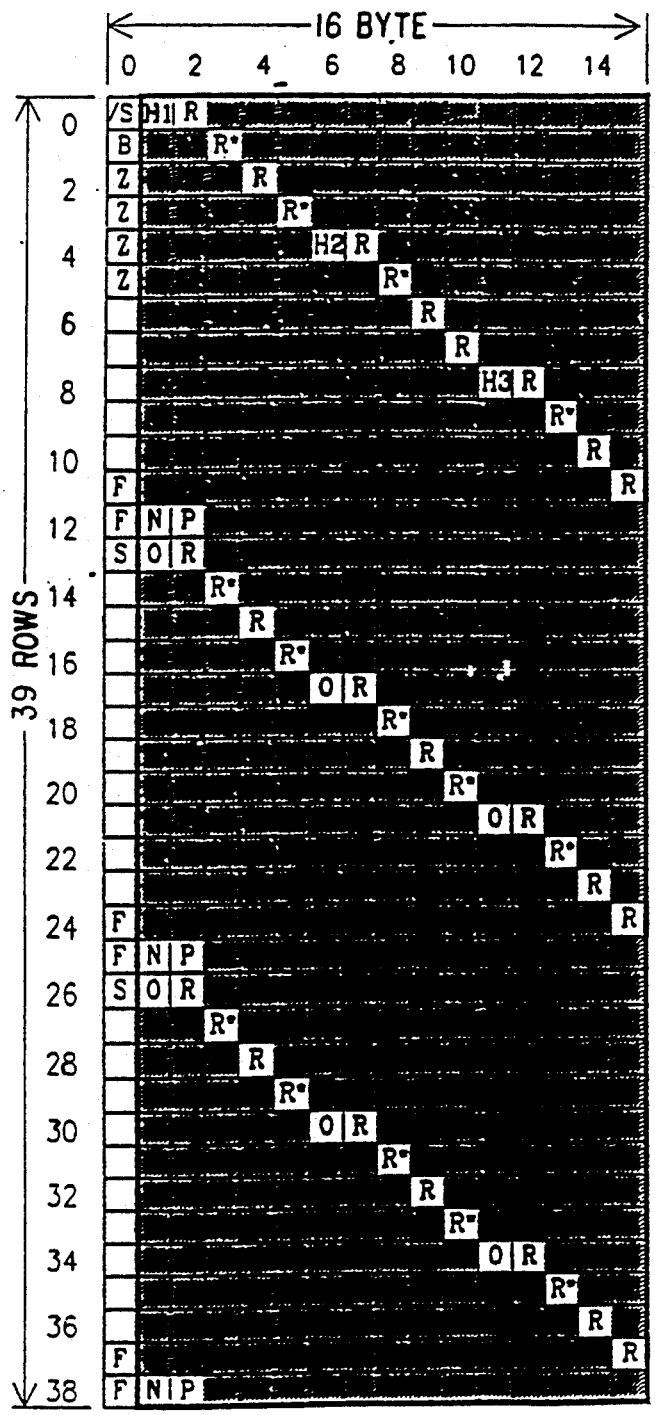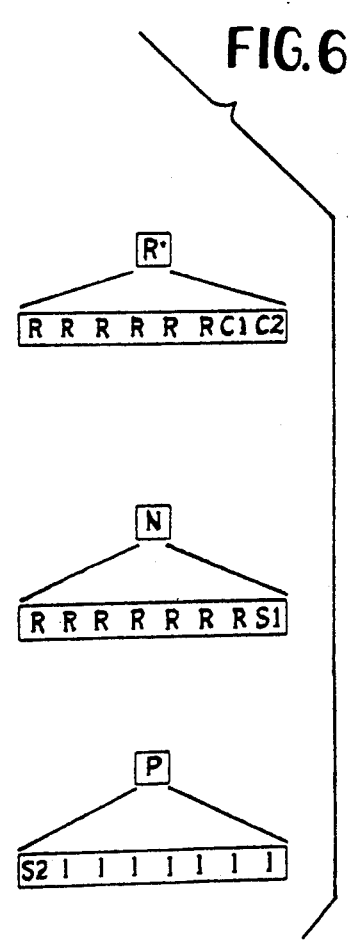
FIG.6
FIG.5

METHOD OF REDUCING WAITING TIME JITTER

CROSS REFERENCE TO RELATED APPLICATIONS

This application claims the priority of German Application Ser. Nos. P 40 14 813.0 and P 40 14 814.9 both filed May 9th, 1990, which are incorporated herein by reference.

BACKGROUND OF THE INVENTION

The present invention relates to a method of reducing waiting time jitter that results when pulse stuffing is employed for the transmission of digital signals.

If a given digital signal is to be transmitted at a bit rate other than its original bit rate, the method of pulse stuffing is employed. This method is employed particularly if plesiochronous signals are bundled in time multiplex in multiplexing devices, with a demultiplexer performing the inverse function. Pulse stuffing may also be employed if, for example for the purpose of synchronization, a signal at a first bit rate is imaged in a switching frame at a second, higher bit rate. This imaging, which is usually performed according to a specific rule, will hereinafter be called mapping and the inverse process demapping.

Essentially two pulse stuffing variations are known: positive stuffing and positive-zero-negative stuffing. For demultiplexing or demapping, the stuffing process must be reversed again to enable the original digital signal to be recovered. An important point is here the recovery of the clock. During this recovery, the clock is smoothed only incompletely. It differs from the original clock by a phase modulation, the jitter. The waiting time jitter is a low frequency phase jitter which, in principle, occurs whenever asynchronous digital signals are synchronized by means of pulse stuffing.

The article by D. L. Duttweiler, entitled "Waiting Time Jitter", published in Bell System Technical Journal, Vol. 51, No. 1, 1972, pages 165–207, and incorporated herein by reference, discloses a derivation of waiting time jitter and experimental data regarding the spectrum of the waiting time jitter. A synchronizer and a desynchronizer for positive stuffing are described.

The article by F. Kühne and K. Lang, entitled "Positiv-Null-Negativ-Stopftechnik für Multiplexübertragung plesio-chroner Datensignale" (Positive-Zero-Negative Stuffing Technique for Multiplex Transmission of Plesiochronous Data Signals) published in Frequency, Volume 32, No. 10, 1978, pages 281–287, and incorporated herein by reference, discusses waiting time jitter during positive-zero-negative stuffing. This publication discloses the writing of an input signal D with a clock T into an elastic memory of a synchronizer, with the addressing being effected by means of a counter Z1 which counts at a clock rate of the clock T. In a control circuit, a read-out signal is generated which acts on a counter Z2 to address the elastic memory for read-out. A phase comparator P compares the outputs of the counters Z1 and Z2. The phase difference is a measure of the fill level of the elastic memory. If this phase difference exceeds or falls below an upper or lower threshold, respectively, a stuffing process is performed at the next stuffing opportunity. The procedures for recovery of the signal D are essentially inverse. The desynchronizer is also provided with two counters and a phase comparator. As long as no stuffing takes place, the clock of the main channel of the input signal is employed as the read-out clock. After a stuffing process, a clock which is somewhat slower or somewhat faster is switched in as the read-out clock for an interval of compensation.

The problem of waiting time jitter during positive-zero stuffing and how to reduce it are discussed by W. D. Grover, T. E. Moore and J. A. McEachern in an article, entitled "Waiting Time Jitter Reduction by Synchronizer Stuff Threshold Modulation", published in GLOBECOM, 1987, 13.7.1, pages 514–518, and incorporated herein by reference. To reduce waiting time jitter, additional stuffing processes are provided for in the synchronizer, with these additional stuffing processes occurring in such a sequence that the effect is a frequency shift of the jitter. To employ this method, it is merely necessary to provide a new control in the synchronizer to determine when stuffing is to take place. While in the past stuffing took place only if a constant threshold were exceeded or not reached, in a process according to Grover, Moore and McEachen, the thresholds are modulated.

A prior synchronizer and desynchronizer, and the associated stuffing method, will be described with reference to FIGS. 1 and 2. The input signal to the synchronizer is a signal D consisting of a stream of bits arriving at a bit rate corresponding to the clock rate of a clock T. The output signal of the synchronizer is composed of a main signal D' and an auxiliary channel D". The original signal D is stored in an elastic memory ES. The elastic memory ES is addressed by means of a write-in counter Z1 counting at the clock rate of the clock T. A read-out clock signal with which the data are read out of elastic memory ES is generated in a control unit S and fed to a read-out counter Z2. If the average bit rates of the signals D and D' deviate from one another, stuffing processes are necessary. A phase comparator P compares the phases of the write-in counter Z1 with those of the read-out counter Z2. If the phase difference deviates from the desired value by a certain amount, control circuit S initiates a stuffing process. If positive stuffing is employed, a stuffing bit (dummy bit) is transferred into the signal D' at a defined location. If negative stuffing is employed, an additional information bit from the elastic memory is transmitted in the auxiliary channel D". The information as to whether a useful information bit or a stuffing bit is being transmitted during a stuffable time period (at a positive stuffing location), or whether an information bit is transmitted in the auxiliary channel D" (at a negative stuffing location), is transmitted at defined time intervals in the auxiliary channel D" and are the so-called stuffing information bits of auxiliary channel D".

Signals D' and D" are combined in a frame to form a signal A and are transmitted.

The input signals of the desynchronizer are the main signal D' and the auxiliary channel D". The output signal is the recovered data signal D* which differs from the synchronizer input signal in that it exhibits waiting time jitter. The procedures for data recovery in the desynchronizer are essentially the reverse of those performed in the synchronizer, as are the described adaptation procedures. If a code word evaluator CA determines on the basis of the stuffing information bits that stuffing did take place, a control circuit S' either puts out an additional pulse so that the counter Z1' writes the information bit I received in auxiliary channel D" into elastic memory ES' (follows the negative stuffing procedure) or the control circuit S' through the counter Z1' suppresses a clock pulse so that the stuffing bit of the signal D' is not written into the elastic memory (follows the positive stuffing procedure). For example, a phase locked loop circuit, including a phase comparator P', a filter F and a voltage controlled oscillator VCO, may be provided to recover the read-out clock signal which actuates read-out counter Z2'. In the phase locked loop circuit, the phase of write-in counter Z1' is compared with the phase of read-out counter Z2', the filter F is employed to filter an output signal of the phase comparator P' and the filtered signal is fed to the voltage controlled oscillator VCO which generates the read-out clock signal.

The measured difference between the phases of the write-in counter Z1 and the read-out counter Z2 corresponds to the fill level of elastic memory ES. Phase information regarding the relative phases of the original signal D and the main output signal D'—given by the change in the average fill level of the elastic memory ES—can be transmitted from the synchronizer to the desynchronizer only in 1-bit steps by means of the stuffing information. When using the conventional positive-zero-negative stuffing procedure, this method of transmitting phase information produces a high waiting time jitter.

SUMMARY OF THE INVENTION

It is an object of the invention to provide a method of reducing waiting time jitter.

According to the method of the invention a first stream of bits D (the original digital signal) is written into a first elastic memory of a synchronizer using a first clock. The first stream of bits D has a first bit rate and the first clock has a corresponding clock rate. A second stream of bits A (a second digital signal) is read out of the first elastic memory using a second clock. The second stream of bits A has a second bit rate, and the second clock has a corresponding clock rate. The second stream of bits A includes the bits of the first stream; that is, the first digital signal is mapped into the second digital signal. The second stream of bits A is defined within a given frame which contains a fixed number of bits and spans a given period of time. The first elastic memory has a fill level which varies during the given frame.

The second stream is pulse stuffed and then transmitted to a desynchronizer. An average value of the fill level of the first elastic memory (first average value) is determined and transmitted to the desynchronizer within the given frame. Those bits from the second stream of bits A which are common to the first stream of bits D are written into a second elastic memory of the desynchronizer. A second average value of the fill level of the second elastic memory is determined in such a manner that this value correlates to the first average value. The first average value is compared with the second average value in a comparator and a comparison signal is formed. A clock signal generating circuit is controlled by the comparison signal so as to generate a clock signal. Those bits of the second stream which are written into the second elastic memory are read out of the second elastic memory at the rate of the generated clock signal.

The invention is based on the following assumptions: a signal D is to be mapped into a signal A. Signals A and D may exhibit frequency fluctuations which cannot be absorbed by an elastic memory so that stuffing must take place in the signal A. The frame of the signal A has sufficient free space to transmit additional information.

In a preferred embodiment of the method according to the invention, the value of the fill level of the elastic memory in the synchronizer is determined at several points within the frame of the signal A, i.e. the supporting locations. The average value is determined by accumulating momentary values of the fill level. The average value is transmitted as additional information to the desynchronizer. The momentary values of the fill level of the elastic memory of the desynchronizer are determined at the same supporting locations in the frame of the signal A and are accumulated to obtain the average value of the fill level. The respective accumulations of momentary fill level values for the synchronizer and the desynchronizer are then compared in the comparator to provide the comparison signal which controls the clock signal generating circuit. The clock signal generating circuit is preferably in a phase locked loop arrangement.

The following criteria are of advantage for a selection of the supporting locations for determining the fill level of the elastic memory: the time spacing of the supporting locations should be equidistant; the number of supporting locations should correspond to the rated value of the bit rate of the signal A divided by the greatest common denominator of the rated values of the bit rates of the signal D and the signal A. In this case, the greatest waiting time jitter corresponds to the product of one to two times the reciprocal of the number of supporting locations and the maximum waiting time jitter.

It may be appropriate to effect the accumulation in less than all of the periods of the pulses of the clock for the digital signal A, to thus reduce the processing speed. In order to have comparable or correlated values for the average fill level of the synchronizer and the desynchronizer, in each case the accumulations must relate to the same number of summands (sample values) and the sample values must have the same position in the frame of the second digital signal A.

The requirements for the phase locked loop arrangement are low; thus, a relatively high cut-off frequency is permissible.

The method of reducing waiting time jitter according to the invention may be combined with any desired method of pulse stuffing such as the positive pulse stuffing method, the negative-zero-positive pulse stuffing method and the threshold modulation method. These methods are described above and in the above-cited publications which are incorporated herein by reference.

To implement the method, it is necessary to determine the average fill level of the elastic memory in the synchronizer and in the desynchronizer. The circuits for determining the average fill level are, in principle, identical in the synchronizer and in the desynchronizer.

BRIEF DESCRIPTION OF THE DRAWINGS

These and other features and advantages of the invention will be further understood from the following detailed description of the preferred embodiments with reference to the accompanying drawings in which:

FIG. 5 shows the frame structure, including additional information; and

FIG. 6 shows bits of the three kinds of bytes shown in FIG. 5.

DESCRIPTION OF THE PREFERRED EMBODIMENT

Figure 1:
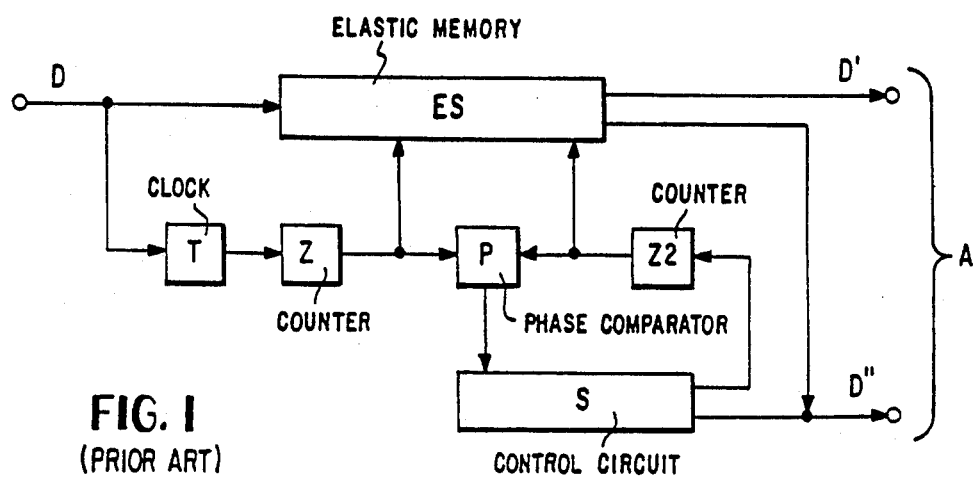
FIG. 1 shows a prior synchronizer.
Figure 2:
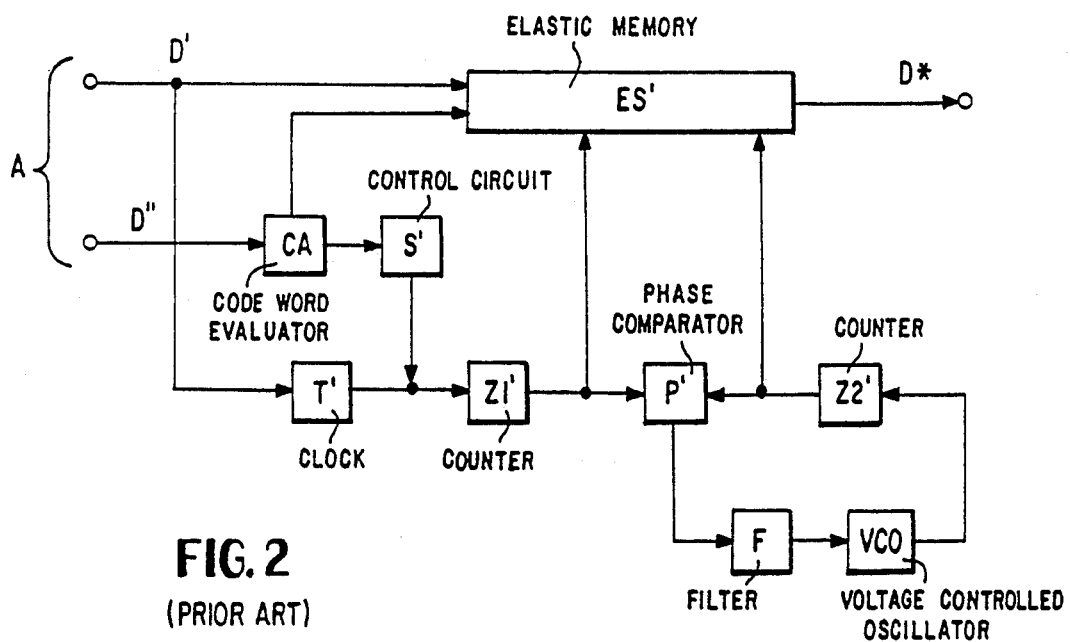
FIG. 2 shows a prior desynchronizer.
Figure 3:
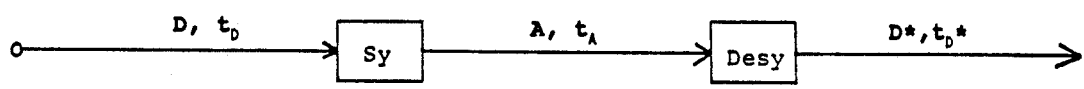
FIG. 3 is a schematic representation of the transmission path.

FIG. 3 shows that a first stream of bits (digital signal) D having a first bit rate is fed into a synchronizer Sy using a first clock $t_D$ having a clock rate corresponding to the first bit rate. The synchronizer feeds second stream of bits (digital signal) A to a desynchronizer Desy at a second bit rate using a second clock $t_A$ having a second clock rate corresponding to the second bit rate. In the desynchronizer Desy, the digital signal D at the first bit rate is to be regenerated. The output signal of the desynchronizer Desy, the recovered signal D*, differs from digital signal D by the waiting time jitter inflicted on the clock signal $t_D$* of the recovered signal D*. The bit rates of the digital signals D and A are selected so that it becomes possible to transmit the signal D in the signal A by means of the pulse stuffing technique.

Figure 4:
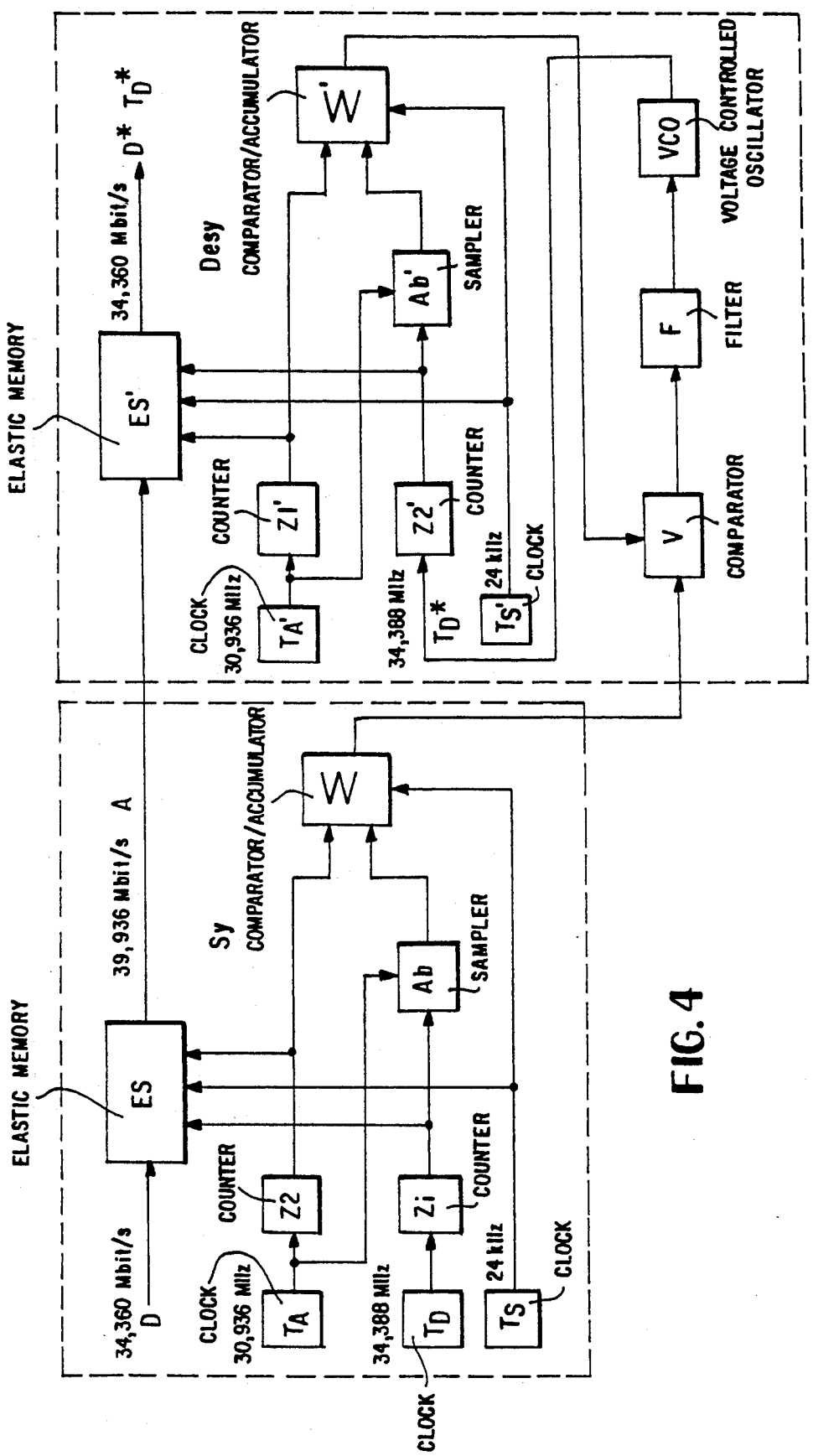
FIG. 4 is a block circuit diagram for a synchronizer and desynchronizer according to the invention.

FIG. 4 gives exemplary bit rates for the digital signals D and A: the signal D here has a bit rate of 34.368 Mbit/s and the signal A has a bit rate of 39.936 Mbit/s. The basic structure of the synchronizer Sy and the desynchronizer Desy can be found in FIG. 4. In the synchronizer Sy, the signal D is fed into an elastic memory ES at 34.368 Mbit/s. The signal is written in with the clock $t_D$ having a clock rate or frequency of 34.368 MHz. A counter Z1 is operated at the same clock rate and provides the count at its output.

The digital signal A is read out from the elastic memory ES. A read-out counter Z2 counts the number of stored bits read out of the elastic memory ES and provides the count at its output. Since the bit rate of the signal D is lower than that of the signal A read-out, and thus also the counting of the counter Z2, exhibits time gaps during which no stored bits are output from the elastic memory ES. The read-out counter operates in response to the clock $t_A$ at a frequency of 39.936 MHz, but correspondingly to the gaps in read-out of stored bits from the elastic memory ES, sometimes exhibits "skips" or "jumps" during which counting stops. The gaps in memory output and corresponding stoppages of counting occur whenever stuffing takes place.

The digital signal A is transmitted in a frame which has a frame frequency of 8 KHz. A frame includes three stuffing frames; that is, each frame of the signal A has three opportunities for stuffing (stuffing opportunities). Thus, the stuffing frame is repeated at a frequency of 24 KHz using a 24 KHz clock $t_S$. The synchronizer Sy is provided with a stuffing unit with which stuffing can be effected according to any desired method including the above-described positive pulse stuffing, positive-zero-negative pulse stuffing, and pulse stuffing which includes threshold modulation. The unit which performs the pulse stuffing is not shown in FIG. 4.

The reduction in waiting time jitter according to the invention utilizes average values which are determined for the fill levels of the elastic memory ES of the synchronizer Sy and of an elastic memory ES' of the desynchronizer Desy. The average value of the fill level of the memory ES can also be used in making decisions as to whether to pulse stuff. For example, stuffing may be directed when the average value of the fill level exceeds or falls below an upper or lower threshold, respectively.

In order to determine the momentary fill level of memory ES, the write-in counter Z1 is sampled at a clock rate of 39.936 MHz by means of a sampler Ab. Each sampled value is compared (subtracted) in a comparator/accumulator $\Sigma$ with (from) the then current state of the read-out counter Z2. The results of the comparisons in the comparator/accumulator $\Sigma$, determined in whole bits, are measures of the momentary fill levels of the memory ES. In order to determine an average value of the fill level of the memory ES, which is to be transmitted once during each stuffing frame, the comparison results are accumulated in the comparator/accumulator $\Sigma$. In order to transmit the sum once during each stuffing frame and at the same bit location therein, the sum is determined and transmitted every n bits of the stream of bits A (n being an appropriately selected positive integer related to the clock frequencies of the clocks $t_A$ and $t_S$).

A new sum is formed for each stuffing frame. In this connection, it is not necessary to provide all comparison results as summands for the accumulation. However, it is expedient to distribute the summands equidistantly over the frame of the digital signal A. This is effected by adding together every mth momentary value of the fill level of the elastic memory ES, where m is a positive integer. In the given example, the value 208 has been determined to be an appropriate number of summands. In addition to the information bits of the digital signal D, an average value for the fill level is transmitted once under the control of the clock $t_S$ during each stuffing frame within the frame of the signal A. The transmission of this value occurs as additional information.

The frame of the signal A is shown in FIG. 5. The frame is composed of 39 rows which each have a width of 16 bytes. Information is transmitted in the hatched fields. The fields marked S contain synchronous words. Parity is transmitted in the field marked P. The fields marked H1, H2 and H3 contain a pointer. The path overhead is contained in the fields marked O. A fixed stuffing byte is contained in each of the fields marked R* and R. Fields R* differ from fields R in that fields R* additionally contain stuffing control bits C1 and C2 as illustrated in FIG. 6. Fields Z provide the port address. The average value of the fill level of the elastic memory ES is, in each case, transmitted in fields marked F, which are in the first column in the last two rows of each stuffing frame. The first column of the frame includes several fields (the unmarked fields) in which no signal is transmitted; during the transmission these fields therefore correspond to gaps. FIG. 6 illustrates the bits of bytes N, R and R*.

Thus, the digital signal A is transmitted to the desynchronizer Desy within the just described frame. The signal A is partially written into the elastic memory ES' The counter Z1', which performs identically to the counter Z2 in the synchronizer Sy, here does the counting of bits in the signal A. However, not all of the bits in the signal A are counted and written into the memory ES' but only those parts of the signal A that are also part of the digital signal D. The sync words, the average values of the fill level and the pointers, for example, are not counted or transferred into the memory ES'. Writing-in takes place at the same frequency as that used to read out the signal A from desynchronizer desy, 39.936 MHz, disregarding the gaps during write-in.

The digital signal D is to be recovered at its original bit rate. The jitter in the bit rate produced by the stuffing bits is here to be kept as low as possible. The output signal of the desynchronizer Desy is a digital signal D* whose bit rate, and the corresponding clock rate, exhibit a slight amount of jitter. The unit responsible for removing the stuffing bits is not shown in FIG. 4.

In the desynchronizer Desy, the average value of the fill level of the memory ES' is determined in the same manner as in the synchronizer Sy, using the write-in counter Z1', a read-out counter Z2', a sampler Ab' and a comparator/accumulator $\Sigma'$. Thus, to determine the momentary fill level of the memory ES', the counter Z1' is sampled at the clock rate of 39.936 MHz by means of the sampler Ab', and each sampled value is compared (subtracted) in the comparator/accumulator $\Sigma'$ with (from) the then current state of the counter Z2'. It should be noted in this connection that the summands for the accumulation of the average value of the fill level are obtained at the same supporting locations within the frame of the digital signal A as the summands in the synchronizer Sy, e.g., at every mth count of the counter Z1', and, again like the synchronizer ES, the accumulation of momentary values of the fill level of the memory ES' is completed at every nth bit of the stream of bits A under the control of a 24 KHz clock.

Thus, it can be ensured that the calculated average values of the fill levels of the elastic memories ES and ES' are comparable. To recover the clock rate for the read-out counter Z2' and read-out of the memory ES', the average values of the fill level of the memory ES' and the transmitted average value of the fill level of the memory ES are compared in a comparator V. The result of the comparison is fed to a filter F and the filtered value controls a voltage controlled oscillator which is provided to reproduce the rate of the original clock tD as well as possible. The regenerated clock signal $t_D$*, which differs only slightly from the output of the clock $t_D$, is then fed to the read-out counter Z2'. As can be seen, the comparator V, the filter F, the voltage controlled oscillator VCO, the counter Z2', the sampler Ab' and the comparator/accumulator $\Sigma'$ form a phase locked loop.

The method according to the invention permits the realization of phase correction in the desynchronizer for the recovery of the original clock pulse $t_D$.

It will be understood that the above description of the present invention is susceptible to various modifications, changes and adaptations, and the same are intended to be comprehended within the meaning and range of equivalents of the appended claims.

What is claimed is:

1. A method of reducing waiting time jitter including the steps of:
    (a) writing a first stream of bits into a first elastic memory of a synchronizer using a first clock, the first stream of bits having a first bit rate and the first clock having a clock rate corresponding to the first bit rate;
    (b) reading a second stream of bits out of the first elastic memory using a second clock, the second stream of bits including the bits of the first stream, the second stream of bitsw having a second bit rate, the second stream of bits being defined within a given frame, said given frame spanning a given period of time, the second clock having a second clock rate corresponding to the second bit rate, the first elastic memory having a fill level which varies during the given frame;
    (c) pulse stuffing the second stream;
    (d) transmitting the pulse stuffed second stream to a desynchronizer;
    (e) determining a first average value of the fill level of the first elastic memory and transmitting the first average value to the desynchronizer within said given frame;
    (f) writing those bits from the second stream of bits which are common to the first stream of bits into a second elastic memory of the desynchronizer;
    (g) determining a second average value of the fill level of the second elastic memory such that the second average value correlates to the first average value;
    (h) comparing the first average with the second average value in a comparator and forming a comparison signal based on the comparison;
    (i) controlling a clock signal generating circuit with the comparison signal so as to generate a clock signal having a third clock rate which approximates the first clock rate with the added effects of waiting time jitter; and
    (j) reading the bits of the second stream written into the second elastic memory during said step (f) out of the second elastic memory using the clock signal at the third clock rate from the clock signal generating circuit.

2. A method of reducing waiting time jitter as defined in claim 1, wherein the step of determining the average value of the fill level of the first elastic memory includes the step of determining momentary values of the fill level at first fixed points in time with reference to said given frame and the step of determining the average value of the fill level of the second elastic memory includes the step of determining momentary values of the fill level at second fixed points in time with reference to said given frame.

3. A method of reducing waiting time jitter as defined in claim 2, wherein the first fixed points in time are identical to the second fixed points in time.

4. A method of reducing waiting time jitter as defined in claim 1, wherein the given frame includes a plurality of stuffing frames, each stuffing frame including a stuffing opportunity, said step of pulse stuffing including the step of stuffing bits into the second stream of bits at the stuffing opportunities, said step of transmitting the average value of the fill level of the first elastic memory being performed once within each of the stuffing frames.

5. A method of reducing waiting time jitter as defined in claim 1, wherein the steps of determining the first and second average values include the steps of:
    counting in a first write-in counter the number of bits written into the first elastic memory during said step (a),
    counting in a first read-out counter the number of bits read out of the first elastic memory during said step (b),
    counting in a second write-in counter the number of bits written into the second elastic memory during said step (f), the count in the second write-in counter correlating precisely with the count of the first read-out counter,
    counting in a second read-out counter the number of bits read out of the second elastic memory during said step (j), sampling the counts of the first write-in counter at the second clock rate to obtain first sampled values, and sampling the counts of the second read-out counter at the second clock rate to obtain second sampled values, comparing the first sampled values with respective counts of the first read-out counter in the synchronizer to obtain momentary values of the fill level of the first elastic memory, comparing the second sampled values with respective counts of the second write-in counter in the desynchronizer to obtain momentary values of the fill level of the second elastic memory, accumulating a number of the momentary values of the fill level of the first elastic memory to obtain a first sum representative of the first average value, and accumulating a number of the momentary values of the fill level of the second elastic memory to obtain a second sum representative of the second average value, the number of accumulated momentary values of the fill level of the first elastic memory being equal to the number of accumulated momentary values of the fill level of the second elastic memory.

6. A method of reducing waiting time jitter as defined in claim 5, wherein said step of accumulating momentary values of the fill level of the first elastic memory and said step of accumulating momentary values of the fill level of the second elastic memory are respectively completed at every nth bit of the second stream of bits A, where n is a positive integer.

7. A method of reducing waiting time jitter as defined in claim 5, wherein the given frame includes a plurality of stuffing frames, each stuffing frame including a stuffing opportunity, said step of pulse stuffing includes the step of stuffing bits into the second stream of bits at the stuffing opportunities, said step of accumulating the first momentary values being performed once for each stuffing frame, said step of transmitting the average value of the fill level of the first elastic memory being performed once within each stuffing frame.

8. A method of reducing waiting time jitter as defined in claim 5, wherein said step of accumulating the momentary values of the fill level of the first elastic memory is effected by adding together every mth momentary value of the fill level of the first elastic memory, and said step of accumulating the momentary values of the fill level of the second elastic memory is effected by adding together every mth momentary value of the fill level of the second elastic memory, where m is a positive integer.

9. A method of reducing waiting time jitter as defined in claim 1, wherein the pulse stuffing is positive pulse stuffing.

10. A method of reducing waiting time jitter as defined in claim 1, wherein the pulse stuffing is positive-zero-negative pulse stuffing.

11. A method of reducing waiting time jitter as defined in claim 1, wherein the pulse stuffing includes threshold modulation.

12. A method of reducing waiting time jitter as defined in claim 1, wherein said step of pulse stuffing includes deciding whether to pulse stuff in dependence upon the first average value.

13. A method of reducing waiting time jitter as defined in claim 1, further comprising the step of providing a time period, in the frame of the second stream of bits, for writing a bit in the second stream of bits, the time duration being equal to the reciprocal of the second bit rate.

14. A method of reducing waiting time jitter as defined in claim 1, wherein the bits from the second stream of bits which are common to the first stream of bits are written into the second elastic memory of the desynchronizer at the second clock rate which corresponds to the second bit rate.

15. A method of reducing waiting time jitter including the steps of:
(a) writing a first stream of bits into a first bit rate into a first elastic memory of a synchronizer using a first clock having a clock pulse rate corresponding to the first bit rate;
(b) reading a second stream of bits out of the elastic memory at a second bit using a second clock having a second clock pulse rate corresponding to the second bit rate, and with the second stream of bits including the bits of the first stream and being defined within a given frame spanning a given period of time;
(c) pulse stuffing the second stream of bits;
(d) transmitting the pulse stuffed second stream of bits to a desynchronizer;
(e) providing a first measure corresponding to an average value of the fill level of the first elastic memory during the given frame and transmitting the first measure to the desynchronizer within said given frame;
(f) writing those bits from the second stream of bits which are common to the first stream of bits into a second elastic memory of the desynchronizer;
(g) providing a second measure corresponding to an average value of the fill level of the second elastic memory such that the second measure correlates to the first measure;
(h) comparing the first measure with the second measure and forming a comparison signal based on the comparison;
(i) controlling a clock signal generating circuit with the comparison signal to generate a clock signal having a third clock pulse rate corresponding essentially to said first clock rate with the added effects of waiting time jitter; and
(j) reading the bits of the second stream written into the second elastic memory during said step (f) out of the second elastic memory using the clock signal having the third clock rate from the clock signal generating circuit.

* * * * *